UNITED STATES PATENT OFFICE.

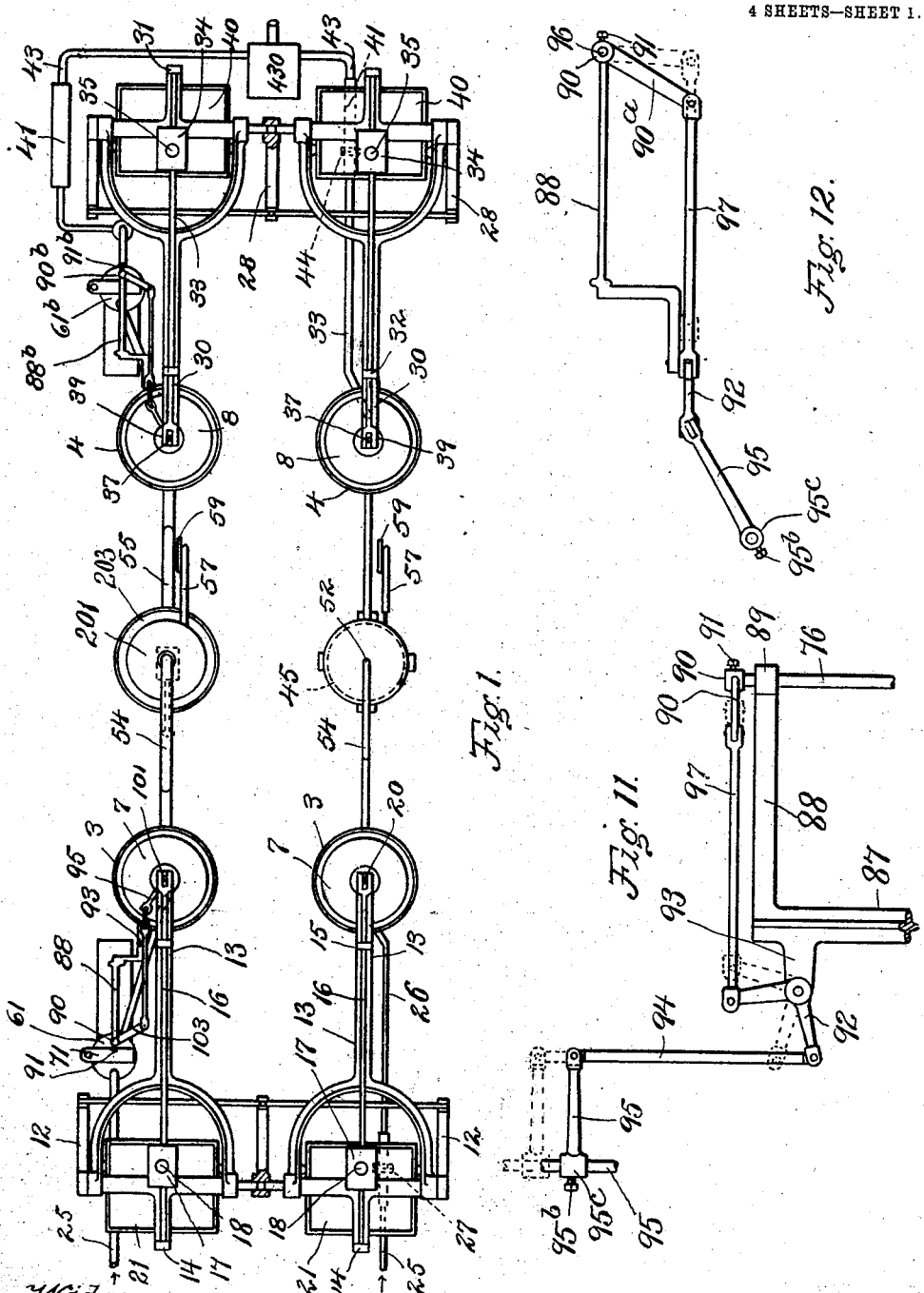

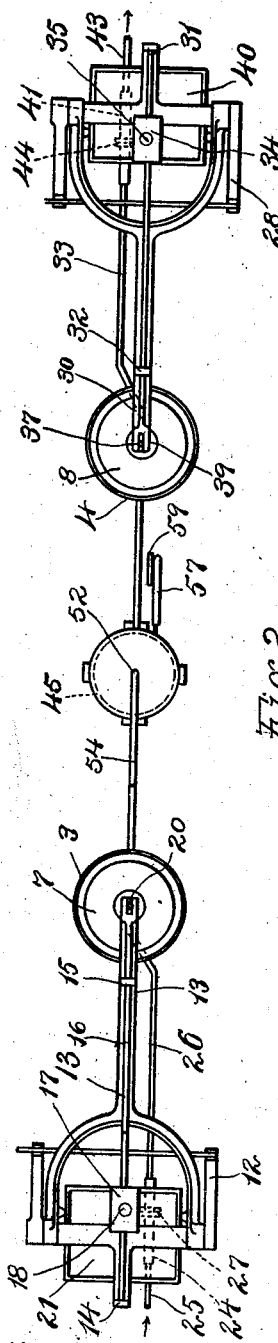

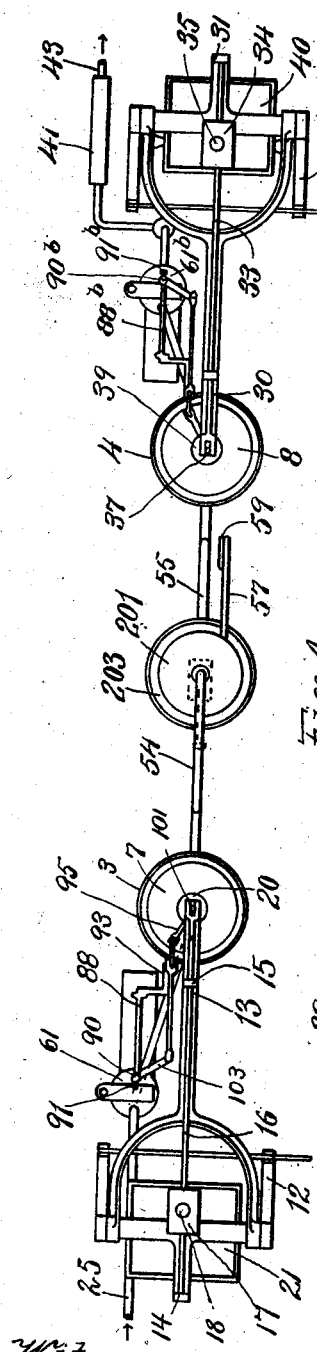

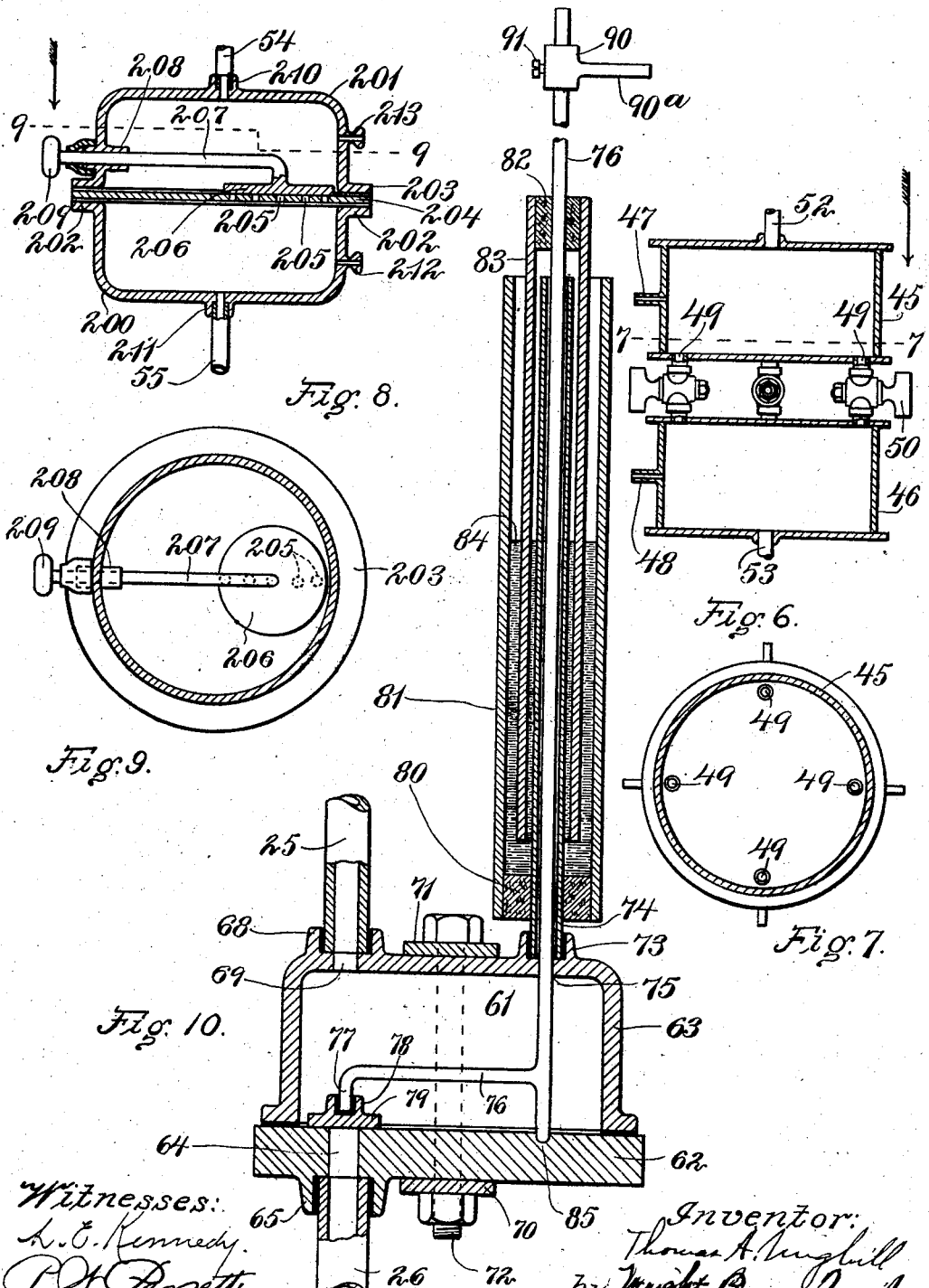

THOMAS ARTHUR MIGHILL, OF BOSTON, MASSACHUSETTS, ASSIGNOR TO STONE & WEBSTER, OF BOSTON, MASSACHUSETTS, A FIRM.

PRESSURE-REGULATOR.

No. 827,410.　　　　　Specification of Letters Patent.　　　Patented July 31, 1906.

Application filed November 13, 1905. Serial No. 287,015.

*To all whom it may concern:*

Be it known that I, THOMAS ARTHUR MIGHILL, of Boston, in the county of Suffolk and State of Massachusetts, have invented certain new and useful Improvements in Pressure-Regulators, of which the following is a specification.

This invention relates to a new and improved apparatus for regulating the flow of gases.

Figure 1 is a top plan view showing an apparatus constructed in accordance with my invention. Fig. 2 is a top plan view of the lower half of the apparatus shown in Fig. 1. Fig. 3 is a side elevation of the apparatus shown in Fig. 2. Fig. 4 is a top plan view of the upper half of the apparatus shown in Fig. 1. Fig. 5 is a side elevation of the apparatus shown in Fig. 4. Fig. 6 is a vertical sectional view of one form of orifice-chamber. Fig. 7 is a cross-sectional view of the same on line 7 7 of Fig. 6 looking in the direction of the arrow. Fig. 8 is a vertical sectional view of another form of orifice-chamber. Fig. 9 is a cross-sectional view of the same on the line 9 9 of Fig. 8 looking in the direction of the arrow. Fig. 10 is a vertical sectional view of that form of controlling-valve shown in Fig. 5. Fig. 11 is a detail perspective view of the lever mechanism by which the valve of Fig. 10 is operated. Fig. 12 is a plan of the parts in Fig. 11, showing the lever mechanism of Fig. 11, but in another position.

The apparatus, as shown in Fig. 1, comprises two machines, each adapted to control the flow of a gas and deliver it into a common mixing-chamber, from which the mixture may be led to any desired point.

While I have shown two machines, I do not wish to be understood as limiting myself to a gang of two, since any number may be employed, depending upon the number of gases to be mixed, or either machine may be used independently in cases where a mixture is not desired.

Referring to the machine shown in the lower half of Fig. 1 and Figs. 2 and 3, 1 2 represent standards. 3 4 represent tanks carried by suitable supports 5 6. The tank 3 has an inverted bell 7 arranged therein, while the tank 4 carries a similar inverted bell 8. Each tank 3 4 is filled to a certain height with water or other suitable liquid 10 to form a seal. The particular kind of liquid 10 to be employed is determined by the chemical properties of the gas to be passed through the apparatus, it being impractical to use water in connection with those gases that are decomposed by water or unite chemically with it.

11 represents a lever pivoted at one end to the standard 1.

12 represents an arm projecting out from the standard 1 beneath the lever 11, the end of the arm adapted to be engaged by the lever to prevent downward movement of the lever beyond a predetermined point.

13 represents a complemental lever pivoted at the top of the standard 1. The lever 13 is formed with a rearwardly and upwardly projecting extension 14. The lever 13 near its front end is formed with an upwardly-projecting lug 15.

16 represents a rod supported at its ends by the extension 14 and lug 15.

17 represents a weight adapted to be slid on the rod 16 and locked at any desired position thereon by means of a set-screw 18.

19 represents a rod connected to the upper end of the bell 7 and pivotally connected to the end of the lever 11 and the lever 13 in such a way that said levers move parallel to each other, and thus maintain the rod 19 and the bell 7 in a vertical position to prevent the canting of the bell in its downward and upward movement.

20 represents a vessel carried by the rod 19 between the levers 11 and 13 and adapted to contain water or other liquid.

21 represents a vessel carried by the standard 1 between the levers 11 and 13, the bottom of the vessel 20 being arranged at a lower elevation than the bottom of vessel 21.

22 represents a flexible pipe connecting the bottom of vessel 21 with the bottom of vessel 20.

Considering the parts as they appear in Fig. 2, as the bell 7 rises its gravity effect increases in proportion to the amount it is withdrawn from the liquid. To overcome this effect and maintain the effective weight of the bell at a constant, the vessels 20 21 and pipe 22 are provided. As the bell 7 rises, the liquid will flow out of vessel 20 into vessel 21, due to the change in level, and the proportions are so arranged that the amount of liquid so displaced from one vessel to the other will counterbalance the effect of gravity due to the partial withdrawal of the bell 7 from the liquid 10. The adjustable weight 17 serves as a means by which the pressure exerted by the bell 7 or weight of the bell system can be varied or adjusted to any desired degree.

23 represents a lug carried by the standard 1 above the arm 12. Against the lower side of this arm is arranged a flexible pipe 24.

25 represents a pipe leading from the source of supply to the pipe 24.

26 represents a pipe leading from the pipe 24 to a point in the bell 7, above the liquid 10.

27 represents a V-shaped lug carried by the lever 11 at a point to engage the pipe 24 and compress it between the lug 27 and the arm 23 as the lever 11 is elevated in order to restrict the passage through the pipe 24 or cut it off altogether, depending upon the position of the lever 11, brought about by the action of the bell 7 in rising or falling, so that when from any cause the pressure of the gas in the bell 7 becomes excessive such excessive pressure will lift the bell 7 and the lever 11, restricting or stopping altogether the passage through the pipe 24, and thereby establishing equilibrium.

The standard 2 in like manner is provided with an arm 28, a lever 29, a lever 30, an extension 31, lug 32, rod 33, weight 34, set-screw 35, and lug 36, arranged below the lever 29. The bell 8 carries a rod 37, pivoted to the ends of levers 29 30. A flexible pipe 38 connects the bottom of the vessel 39, carried by the rod 37, to the bottom of the vessel 40, carried by the standard 2.

41 represents a flexible pipe arranged on top of the arm 36.

42 represents a pipe passing from the space in the bell 8 above the liquid 10, through the bottom of tank 4, to the inner end of the pipe 41.

43 represents a pipe leading from the pipe 41 to any desired point, as a mixing-chamber 430, the construction and arrangement of which will depend upon the character of the gases admitted.

The operation of this half of the machine is as follows: When for any reason the pressure in the bell 8 falls below a predetermined amount, represented by the pressure of the bell system, the bell 8 will settle, depressing the levers 29 and 30, thus causing the lug 44 on the under side of said lever 29 to engage the pipe 41 and, compressing its walls together, restrict the passage through the pipe or stop it altogether, to establish equilibrium of the bell system. The pressure to be exerted by either of the bells 7 or 8 is determined by the bell system of that bell, and the pressure of each bell system can be varied by means of the weight 17 or 34.

Referring to Figs 2, 3, 6, and 7, what I have termed the "orifice-chamber" is composed of two chambers 45 46, one above the other, the walls of which are of material to resist the action of the gases to pass therethrough. The chamber 45 is provided with a nipple 47. The chamber 46 is provided with a nipple 48. The lower wall of the chamber 45 is provided with a series of small openings 49, which I term "orifices." These orifices 49 are each connected with the top wall of chamber 46 by means of a valve 50, whose passages are relatively very large in comparison with the diameter of the orifices 49. While four of the orifices 49 are shown, I may make use of any number. The valves 50 are not intended to be partially closed or partially open, but are intended to be fully open or fully closed. When a valve 50 is closed, it cuts off entirely its orifice 49. Whenever a valve 50 is open, its purpose is to produce the same effect as if the orifice 49 of chamber 45 opened directly into chamber 46. The orifices 49 supply one of the controls by which the velocity of the gas is regulated.

52 represents a nipple projecting from the top of the chamber 45.

53 represents a nipple projecting from the bottom of chamber 46.

54 represents a pipe running from the chamber 45 into the bell 7 above the liquid 10 through the bottom of the tank 3 and connects with the nipple 52.

55 represents a pipe running from the nipple 53 through the bottom of the tank 4 to the space in the bell 8 above the level of the liquid 10.

56 represents a pipe connected with the nipple 48 at one end and at its other end to one leg of a U-shaped gage 58.

57 represents a pipe connected with the nipple 47 at one end and at its other end to the other leg of the gage or manometer 58.

59 represents an index-plate or plate carrying graduations upon which the differences of level of the liquid in the two legs of the gage 58 may be indicated, the latter serving as a means to show the relation of the pressure in the chamber 45 and the bell 7 to the pressure in the chamber 46 and bell 8.

The purpose of the bell system 7, with its connections, is to control the pressuree in th chamber 45, the bell system 8 and its connections controlling the pressure in the chamber 46. The bell system 7 and its connections maintain a continuous pressure in the chamber 45, and the bell system 8 and its connections maintain a constant pressure in the chamber 46. The effect of these two pressures is to maintain a constant difference of pressures between the two chambers and a constant flow of gas through such of the orifices 49 as are open. It is to be understood that the pressure in bell 7 is greater than the pressure in bell 8 in the system as described.

It is further evident that by changing the adjustments of the bell systems 7 8 I can produce any desired difference of pressure between the chambers 45 46, and thereby secure any desired rate of flow. This adjustment of the bell system constitutes another control by which the velocity of the gases may be regulated.

In the upper half of Fig. 1 and in Figs. 4, 5, 8, 9, 10, 11, and 12 I have shown a form of machine to control the flow of gases that could not be used in the form of machine shown in Fig. 2, because of the action of the gases, such as chlorin, for illustration, and gases having a like or similar corrosive action upon the pipes 27 and 41. The bell systems are the same as in the other form and require no further description. In connection with this machine I have illustrated my preferred form of orifice-chamber and also a construction of valve suitable for use in connection with corrosive gases.

Referring to the left of Figs. 5 and 10, 60 represents a suitable base or support carrying valve-chamber 61. This chamber is formed by a base 62 and a tight-fitting hood 63. In the base 62 is formed a hole 64.

65 represents an annular ring surrounding the lower end of the hole 64, leaving a marginal rim between said ring and the wall of the hole.

26 represents a pipe one end of which is arranged inside the ring 65, the space between the ring and pipe being filled with suitable cement. The pipe 26 leads from the valve-chamber 60, as shown, through the bottom of the tank 3 to the space between the top of the liquid 10 and the bell 7.

25 represents a pipe leading from the source of supply to the top of the valve-chamber 61, the end of the pipe 25 being arranged inside of and cemented to a ring 68, corresponding to the ring 65. The pipe 25 communicates with a hole 69 in the top of the chamber. The hood 63 and base 62 are further maintained together by means of a strap 70 on the bottom of the base 62 and a strap 71 on the top of the hood 63, connected together by bolts 72.

73 represents an annular ring formed on the hood 63, corresponding to the rings 68 and 65.

74 represents a glass tube the end of which is arranged in the end of the ring 73 and secured thereto by suitable cement, the tube 74 communicating with a hole 75 through the hood.

76 represents a glass rod arranged in the tube 74, extending down through the hole 75 into the chamber 61, the lower end 85 of the rod resting in a complemental-shaped bearing in the base 62. The rod 76 in the chamber 61 is formed with a horizontal arm 76, the end 77 of which is arranged in a cup-shaped cavity 78 on the top of a sliding valve 79, adapted to close or open the hole 64.

80 represents a disk of any suitable material secured on the tube 74 just above the ring 73. The disk 80 carries a tube 81, adapted to contain water or other suitable liquid.

82 represents a disk carried by the rod 76 above the top of the tube 81.

83 represents a tube carried by the disk 82 and extended down inside the tube 81 outside the tube 74 with its lower end immersed in the liquid 84. It will thus be seen that the rod 76 or valve-stem is supported without friction, and yet the escape of the contents of the valve-chamber is prevented by the liquid seal 84.

87 represents a standard the upper end of which is formed with an arm 88, the end 89 of which is perforated to serve as a bearing for the rod 76.

90 represents a collar adjustably secured upon the upper end of the rod 76 by means of a set-screw 91 in a position to properly control the valve 79.

92 represents a bell-crank pivoted to a lug 93, carried by the standard 87.

94 represents an arm pivoted at its lower end to the horizontal member of the bell-crank 92 and pivoted at its upper end to an arm 95, carried by a collar 95$^c$, that is adjustably secured to the rod 95 by a set-screw 95$^b$.

97 represents a rod one end of which is pivoted to the vertical member of the bell-crank 92, the opposite end of said rod being pivoted to the free end of an arm 90$^a$, carried by the collar 90.

By the described arrangement as the bell 7 rises and falls it will operate the described lever mechanism, imparting a reciprocating rotary motion to the rod 76, thereby moving the valve 78 to cover or uncover the hole 64. The parts are so adjusted that if for any reason the pressure in the bell 7 becomes excessive, causing the bell to rise, such motion will move the valves 78 to close the hole 64 and bring the system to equilibrium.

The right-hand end of the machine shown in Fig. 4 is equipped with a like valve and lever mechanism, the corresponding parts of the right-hand half of the machine in Fig. 4 being distinguished from those of the left-hand half by the use of the symbol $b$, added to the symbols employed in designating the valve and lever mechanism of the left-hand half, as illustrated in Fig. 4.

The left-hand end of the machine shown in Fig. 5 corresponds in arrangement and mode of operation to the left-hand half of the machine shown in Fig. 2, while the right-hand end corresponds in arrangement and mode of operation to the right-hand half shown in Fig. 2.

As the bell 8 in Fig. 5 rises and falls it will operate the described lever mechanism, imparting an oscillating motion to the rod 76$^b$, thereby moving its connecting-valve to cover or uncover its complemental ports. The ports are so arranged that if for any reason the pressure in the bell 8 falls below the desired point, due to the contents of the bell passing out through the pipe 43 faster than it is admitted to the bell, such decrease in pressure will cause the bell 8 to fall, such motion moving the bell connecting the rod 76$^b$ to close the complemental exit-ports and bring the system to equilibrium.

Referring to Figs. 4, 5, 8, and 9, wherein I have illustrated the form of orifice-chamber to take the place of orifice-chamber shown in Figs. 3, 6, and 7, 200 represents the lower half of said chamber, and 201 represents the upper half of said chamber, the lower half 200 being formed with a flange 202, while the upper half is formed with a complemental flange 203, adapted to receive and hold between them a diaphragm 204, formed with a number of orifices 205, arranged in line.

206 represents a valve provided with a stem 207, the outer end of which passes through a stuffing-box 208 and is provided with a handle 209. The part 201 is formed with a nipple 210, connected to the pipe 54, while the part 200 is formed with a nipple 211, connected to the pipe 55. A nipple 212 on the part 200 connects with the pipe 56, while a nipple 213 on the part 201 connects the pipe 57 with a manometer 58. The walls of the orifice-chamber, valve 206, and the several parts are composed of glass or some suitable material to resist the corrosive action of the gases to be passed therethrough. While in the form of orifice-chamber shown in Fig. 6 the individual orifices are open or closed by their respective cocks or the form of orifice-chamber shown in Figs. 8 and 9 and used in connection with the machine shown in Fig. 5 the several orifices are opened and closed by sliding the valve 206, the operation of the machine as a whole shown in Figs. 4 and 5 is the same as that shown in Figs. 2 and 3.

By the described machine I am enabled to establish and maintain a predetermined rate of flow of gas to either machine when one is used independent of the other and also to maintain a predetermined rate of flow of two or more gases when it is desired to form a mixture in a definite proportion. The two bell systems of each machine, with their connecting orifice-chamber, comprise an automatic continuously-acting apparatus, continuously and automatically maintaining a predetermined pressure in each half of the orifice-chamber, with the pressure in the upper orifice-chamber at a fixed amount in excess of the pressure in the lower half of the orifice-chamber, thereby securing a predetermined flow through the orifices of the chamber.

Having thus explained the nature of my invention and described a way of constructing and using the same, though without attempting to set forth all of the forms in which it may be made or all of the modes of its use, what I claim, and desire to secure, is—

1. In an apparatus of the class specified, a bell system connected with a source of supply, a valve controlled by said bell system, a bell system connected with a suitable receiving-receptacle, a valve controlled by said system, and an orifice-plate connecting said systems.

2. In an apparatus of the class specified, a pressure-regulator connected with the source of supply, a pressure-regulator connected with any suitable receptacle, an orifice-plate connecting said regulators but independent thereof, means controlled by the first of said regulators to maintain a predetermined amount of pressure on the feed side of the orifice-plate, means controlled by the other of said regulators to maintain a predetermined amount of pressure on the delivery side of the said orifice-plate whereby a predetermined difference of pressure is maintained on opposite sides of the orifice-plate.

3. In an apparatus of the class specified, a regulator connected with the source of supply, a valve controlled by said regulator, a regulator connected with a suitable receiving-receptacle, a valve controlled by said regulator, and an orifice-plate connecting said regulators.

4. A pressure-controlling apparatus comprising a stationary receptacle, a complemental movable receptacle, said receptacles being connected together by a liquid seal, a stem connected to the movable receptacle, a receptacle carried by said stem, a stationary receptacle, a pipe or other connection between the said two last-mentioned receptacles, whereby as the first-mentioned movable receptacle rises, some of the contents of the receptacle carried by the stem will pass to the stationary receptacle, and vice versa, to compensate for change in the effective weight of the first-mentioned movable receptacle, due to change in the depth of immersion.

In testimony whereof I have affixed my signature in presence of two witnesses.

THOMAS ARTHUR MIGHILL.

Witnesses:
　H. L. ROBBINS,
　E. T. GRAHAM.